United States Patent
Liu

(10) Patent No.: US 10,915,822 B2
(45) Date of Patent: Feb. 9, 2021

(54) COMPLEX EVENT PROCESSING METHOD, APPARATUS, AND SYSTEM

(71) Applicant: Huawei Technologies Co., Ltd., Shenzhen (CN)

(72) Inventor: Shikai Liu, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 911 days.

(21) Appl. No.: 15/622,754

(22) Filed: Jun. 14, 2017

(65) Prior Publication Data

US 2017/0278003 A1    Sep. 28, 2017

Related U.S. Application Data

(63) Continuation of application No. PCT/CN2015/084360, filed on Jul. 17, 2015.

(30) Foreign Application Priority Data

Dec. 15, 2014 (CN) .......................... 2014 1 0775571

(51) Int. Cl.
  *G06N 5/02*    (2006.01)
  *G06F 9/44*    (2018.01)

(52) U.S. Cl.
  CPC .............. *G06N 5/025* (2013.01); *G06F 9/44* (2013.01)

(58) Field of Classification Search
  CPC .................................. G06N 5/025; G06F 9/44
  (Continued)

(56) References Cited

U.S. PATENT DOCUMENTS

| 2008/0109824 A1* | 5/2008 | Chen ....................... G06F 9/542 |
| | | 719/318 |
| 2009/0150319 A1* | 6/2009 | Matson .................. G06Q 30/02 |
| | | 706/47 |

(Continued)

FOREIGN PATENT DOCUMENTS

| CN | 101334727 A | 12/2008 |
| CN | 101685466 A | 3/2010 |

(Continued)

OTHER PUBLICATIONS

Adi et al., "Complex Event Processing for Financial Services", Proceedings of the IEEE Services Computing Workshops (SCW'06). (Year: 2006).*

(Continued)

*Primary Examiner* — Dave Misir
(74) *Attorney, Agent, or Firm* — Slater Matsil, LLP

(57) ABSTRACT

Embodiments of the present invention relate to the field of communications technologies, and provide a complex event processing method, apparatus, and system, so that when complex event processing is performed, a system requiring a synchronous response provides a synchronous response externally and avoids information flooding. A solution provided by the present invention includes: receiving an input event sent by an event source, where the input event includes an identifier of an object and an event type; acquiring, according to a preset database, M mode rules corresponding to the event type; performing mode matching between the input event and the M mode rules separately to acquire N output events; and if N is greater than or equal to 1, sending at least one piece of event information to a real-time decision apparatus, where each piece of the event information includes Q output events and indication information.

10 Claims, 7 Drawing Sheets

(58) Field of Classification Search
USPC .......................................................... 706/47
See application file for complete search history.

(56) References Cited

U.S. PATENT DOCUMENTS

| | | | | |
|---|---|---|---|---|
| 2010/0070981 | A1* | 3/2010 | Hadar | G06F 9/542 719/318 |
| 2012/0084317 | A1* | 4/2012 | Sakamoto | G06F 16/162 707/769 |
| 2013/0191185 | A1* | 7/2013 | Galvin | G06Q 10/10 705/7.37 |
| 2013/0332240 | A1* | 12/2013 | Patri | G06Q 10/06 705/7.36 |
| 2013/0346600 | A1* | 12/2013 | Massey | G06F 9/542 709/224 |
| 2014/0047448 | A1 | 2/2014 | Bishop et al. | |
| 2014/0237487 | A1* | 8/2014 | Prasanna | G06Q 10/10 719/318 |
| 2014/0324755 | A1* | 10/2014 | Park | G06N 5/02 706/47 |

FOREIGN PATENT DOCUMENTS

| | | |
|---|---|---|
| CN | 102214187 A | 10/2011 |
| CN | 102798389 A | 11/2012 |
| CN | 103413054 A | 11/2013 |
| CN | 103455611 A | 12/2013 |
| CN | 103513985 A | 1/2014 |
| CN | 103676924 A | 3/2014 |
| GB | 2503436 A | 1/2014 |

OTHER PUBLICATIONS

Roth et al., "Event Data Warehousing for Complex Event Processing", IEEE, 2010. (Year: 2010).*
Bulow et al., "Monitoring of Business Processes with Complex Event Processing", BPM 2013 Workshops, LNBIP 171, pp. 277-290, 2014. (Year: 2014).*

* cited by examiner

COMPLEX EVENT PROCESSING METHOD, APPARATUS, AND SYSTEM

CROSS-REFERENCE TO RELATED APPLICATIONS

This application is a continuation of International Application No. PCT/CN2015/084360, filed on Jul. 17, 2015, which claims priority to Chinese Patent Application No. 201410775571.2, filed on Dec. 15, 2014. All the aforementioned applications are hereby incorporated by reference in their entireties.

TECHNICAL FIELD

The present invention relates to the field of communications technologies, and in particular, to a complex event processing method, apparatus, and system.

BACKGROUND

Currently, event-based marketing in the telecommunications industry is in a state of early development, and in particular, complex event processing is still in an initial phase. A complex event processing system and a real-time decision system in the industry are generally two independent systems, and no deep integration is implemented.

A real-time decision system requires implementation of a synchronous response, an object (user or device) gets in contact actively to generate an input event, and the real-time decision system generates an execution action only according to a marketing rule triggered by the input event, and returns a response message of the recommendatory execution action to the object.

A complex event processing (CEP) technology is generally driven by an input event, and responds asynchronously, that is, the input event triggers a rule for mode matching, and an output event is generated; if the input event triggers multiple rules, multiple output events are generated; the output events are independent of each other, and not correlated, and the output events are not returned to an event source.

If the real-time decision system uses the CEP technology to perform complex event processing, first, a CEP device receives an input event from an event source, and performs CEP processing on the input event to obtain multiple output events and send the output events to the real-time decision system; then the real-time decision system separately matches the multiple output events with simple rules, and obtains multiple final execution actions.

In the foregoing process of performing complex event processing by the real-time decision apparatus by using the CEP technology, on the one hand, because of asynchronous responding (no feedback) in CEP, the CEP device is also an asynchronous response device, and the multiple final execution actions obtained by the real-time decision system requiring a synchronous response (feedback) cannot be fed back to the event source, that is, a real-time decision system requiring a synchronous response cannot provide a synchronous response externally when performing complex event processing; on the other hand, even if the CEP device is simply changed to a synchronous response device, the multiple final execution actions obtained by the real-time decision system are all fed back to the object, and a phenomenon of information flooding is caused.

SUMMARY

Embodiments of the present invention provide a complex event processing method, apparatus, and system, so that when complex event processing is performed, a system requiring a synchronous response provides a synchronous response externally and avoids information flooding.

To achieve the foregoing objective, the following technical solutions are used in the embodiments of the present invention:

According to a first aspect, a complex event processing method is provided and applied to a complex event processing apparatus. The method includes receiving an input event sent by an event source. The input event is triggered at the event source by an object, and the input event includes an identifier of the object and an event type; acquiring, according to a preset database, M mode rules corresponding to the event type, where each mode rule includes one sending primary key, the preset database includes at least one event type and mode rules corresponding to the event type, and M is greater than or equal to 1. The method further includes performing mode matching between the input event and the M mode rules separately to acquire N output events, where each output event includes a sending primary key in a mode rule for acquiring each output event, the N is greater than or equal to 0, and the N is less than or equal to the M; and if the N is greater than or equal to 1, sending at least one piece of event information to a real-time decision apparatus, where each piece of the event information includes Q output events and indication information, where the Q output events are output events that are included in the N output events and have a same sending primary key, the Q is greater than or equal to 1, and the indication information includes the identifier of the object, so that the real-time decision apparatus is instructed to send execution information of an execution action to the object.

With reference to the first aspect, in a first possible implementation manner of the first aspect, the indication information further includes an identifier of the complex event processing apparatus, and after the sending at least one piece of event information to a real-time decision apparatus, the method further includes: receiving a response message sent by the real-time decision apparatus, where the response message includes the identifier of the object and the execution information of the execution action; and sending, according to the identifier of the object, the execution information of the execution action to the event source indicated by the identifier of the object.

With reference to the first aspect or the first possible implementation manner of the first aspect, in a second possible implementation manner of the first aspect, the mode rule further includes a mode matching primary key, an execution condition, and an event; and correspondingly, the performing mode matching between the input event and the M mode rules separately to acquire N output events specifically includes: if it is determined, according to a mode matching primary key in a first mode rule, that an execution condition in the first mode rule may be met, acquiring an output event of the first mode rule, where the output event of the first mode rule includes a sending primary key and an event in the first mode rule, and the first mode rule is any one of the M mode rules; or if it is determined, according to a mode matching primary key in a second mode rule, that an execution condition in the second mode rule is not met, generating no output event, where the second mode rule is any one of the M mode rules.

With reference to the first aspect or the first possible implementation manner of the first aspect, in a third possible implementation manner of the first aspect, the complex event processing apparatus includes at least two mode matching modules; and correspondingly, before the performing mode matching between the input event and the M mode rules separately to acquire N output events, the method further includes: allocating the input event to P mode matching modules separately according to the sending primary key included in each mode rule in the M mode rules, where the P mode matching modules are mode matching modules that are in the at least two mode matching modules and corresponding to the sending primary key included in each mode rule in the M mode rules in the preset database, and the preset database further includes at least one sending primary key and a mode matching module corresponding to the at least one sending primary key.

With reference to the third possible implementation manner of the first aspect, in a fourth possible implementation manner of the first aspect, the mode rule further includes a mode matching primary key, an execution condition, and an event; and correspondingly, the performing mode matching between the input event and the M mode rules separately to acquire N output events includes: acquiring, by each mode matching module in the P mode matching modules by filtering the M mode rules separately, mode rules having sending primary keys corresponding to the mode matching module in the preset database; and performing, by each mode matching module in the P mode matching modules, mode matching between the input event and the mode rules corresponding to the mode matching module separately to acquire the N output events.

With reference to the fourth possible implementation manner of the first aspect, in a fifth possible implementation manner of the first aspect, the performing, by each mode matching module in the P mode matching modules, mode matching between the input event and the mode rules corresponding to the mode matching module separately to acquire the N output events includes: if it is determined, according to a mode matching primary key in a third mode rule, that an execution condition in the third mode rule may be met, acquiring an output event of the third mode rule, where the output event of the third mode rule includes a sending primary key and an event in the third mode rule, and the third mode rule is any one of the mode rules corresponding to the mode matching module; or if it is determined, according to a mode matching primary key in a fourth mode rule, that an execution condition in the fourth mode rule is not met, generating no output event, where the fourth mode rule is any one of the mode rules corresponding to the mode matching module.

According to a second aspect, a complex event processing method is provided and applied to a real-time decision apparatus. The method includes receiving event information sent by a complex event processing apparatus. The event information includes at least one event and indication information. The method further includes matching each event in the at least one event with decision rules in a preset database separately to acquire P execution actions, where P is greater than or equal to 1, and the preset database includes at least one decision rule and an execution action corresponding to the at least one decision rule. The method further includes sending, according to the indication information, execution information for executing at least one execution action in the P execution actions.

With reference to the second aspect, in a first possible implementation manner of the second aspect, the indication information includes an identifier of an object, and the sending, according to the indication information, execution information for executing the at least one execution action, includes: sending, according to the identifier of the object, the execution information for executing the at least one execution action to the object.

With reference to the second aspect, in a second possible implementation manner of the second aspect, the indication information includes an identifier of an object and an identifier of the complex event processing apparatus, and the sending, according to the indication information, execution information for executing the at least one execution action, includes: sending a response message to the complex event processing apparatus according to the identifier of the complex event processing apparatus, where the response message includes the identifier of the object and the execution information for executing the at least one execution action.

With reference to the second aspect or the first possible implementation manner of the second aspect or the second possible implementation manner of the second aspect, in a third possible implementation manner of the second aspect, the matching each event in the at least one event with decision rules in a preset database separately to acquire P execution actions includes: if one event meets one decision rule, acquiring, according to the preset database, an execution action corresponding to the one decision rule, where the one event is any one event in the at least one event, and the one decision rule is any one decision rule in the preset database.

With reference to the second aspect or any one of the first possible implementation manner of the second aspect to the third possible implementation manner of the second aspect, in a fourth possible implementation manner of the second aspect, before the sending, according to the indication information, execution information for executing at least one execution action in the P execution actions, the method includes: selecting the at least one execution action from the P execution actions.

With reference to the fourth possible implementation manner of the second aspect, in a fifth possible implementation manner of the second aspect, the selecting the at least one execution action from the P execution actions includes: acquiring, according to the preset database, a priority coefficient of each execution action in the P execution actions, where the preset database further includes at least one execution action and a priority coefficient corresponding to the at least one execution action; and selecting, according to the priority coefficient of each execution action, an execution action whose priority coefficient is greater than or equal to a preset threshold.

According to a third aspect, a complex event processing apparatus is provided and includes: a receiving unit, configured to receive an input event sent by an event source, where the input event is triggered at the event source by an object, and the input event includes an identifier of the object and an event type; an acquiring unit, configured to acquire, according to a preset database, M mode rules corresponding to the event type, where each mode rule includes one sending primary key, the preset database includes at least one event type and mode rules corresponding to the event type, and M is greater than or equal to 1; and a mode matching unit, configured to perform mode matching between the input event and the M mode rules separately to acquire N output events, where each output event includes a sending primary key in a mode rule for acquiring each output event, the N is greater than or equal to 0, and the N is less than or equal to the M; where the mode matching unit is further configured to: if N is greater than or equal to 1, send at least one piece of event information to a real-time decision apparatus, where each piece of the event information includes Q output events and indication information, where the Q output events are output events that are included in the N output events and have a same sending primary key, Q is greater than or equal to 1, and the indication information includes the identifier of the object, so that the real-time decision apparatus is instructed to send execution information of an execution action to the object.

With reference to the third aspect, in a first possible implementation manner of the third aspect, the receiving unit is further configured to: receive a response message sent by the real-time decision apparatus, where the response message includes the identifier of the object and the execution information of the execution action; and send, according to the identifier of the object, the execution information of the execution action to the event source indicated by the identifier of the object.

With reference to the third aspect or the first possible implementation manner of the third aspect, in a second possible implementation manner of the third aspect, the mode rule further includes a mode matching primary key, an execution condition, and an event; and correspondingly, the mode matching unit specifically is configured to: if it is determined, according to a mode matching primary key in a first mode rule, that an execution condition in the first mode rule may be met, acquire an output event of the first mode rule, where the output event of the first mode rule includes a sending primary key and an event in the first mode rule, and the first mode rule is any one of the M mode rules; or if it is determined, according to a mode matching primary key in a second mode rule, that an execution condition in the second mode rule is not met, generate no output event, where the second mode rule is any one of the M mode rules.

With reference to the third aspect or the first possible implementation manner of the third aspect, in a third possible implementation manner of the third aspect, the complex event processing apparatus further includes a routing unit, and the mode matching unit includes at least two mode matching modules, where: the routing unit is configured to allocate the input event to P mode matching modules separately according to the sending primary key included in each mode rule in the M mode rules acquired by the acquiring unit, where the P mode matching modules are mode matching modules that are in the at least two mode matching modules and corresponding to the sending primary key included in each mode rule in the M mode rules in the preset database, and the preset database further includes at least one sending primary key and a mode matching module corresponding to the at least one sending primary key; and each mode matching module is configured to separately perform matching between the input event and mode rules having sending primary keys corresponding to the mode matching module itself in the preset database, in the M mode rules, and when the input event matches one mode rule corresponding to the mode matching module, acquire an output event.

With reference to the third possible implementation manner of the third aspect, in a fourth possible implementation manner of the third aspect, the mode rule further includes a mode matching primary key, an execution condition, and an event; and correspondingly, the mode matching module specifically is configured to: acquire, by filtering the M mode rules, the mode rules having the sending primary keys corresponding to the mode matching module itself in the preset database; and if it is determined, according to a mode matching primary key in a third mode rule, that an execution condition in the third mode rule may be met, acquire an output event of the third mode rule, where the output event of the third mode rule includes a sending primary key in the third mode rule and an event, and the third mode rule is any one of the mode rules corresponding to the mode matching module; or if it is determined, according to a mode matching primary key in a fourth mode rule, that an execution condition in the fourth mode rule is not met, generate no output event, where the fourth mode rule is any one of the mode rules corresponding to the mode matching module.

According to a fourth aspect, a real-time decision apparatus is provided and includes: a receiving unit, configured to receive event information sent by a complex event processing apparatus, where the event information includes at least one event and indication information; a rule matching unit, configured to match each event in the at least one event with decision rules in a preset database separately to acquire P execution actions, where P is greater than or equal to 1, and the preset database includes at least one decision rule and an execution action corresponding to the at least one decision rule; and a sending unit, configured to send, according to the indication information, execution information for executing at least one execution action in the P execution actions.

With reference to the fourth aspect, in a first possible implementation manner of the fourth aspect, the indication information includes an identifier of an object; and correspondingly, the sending unit specifically is configured to send, according to the identifier of the object, the execution information for executing the at least one execution action to the object.

With reference to the fourth aspect, in a second possible implementation manner of the fourth aspect, the indication information includes an identifier of an object and an identifier of the complex event processing apparatus; and correspondingly, the sending unit specifically is configured to send a response message to the complex event processing apparatus according to the identifier of the complex event processing apparatus, where the response message includes the identifier of the object and the execution information for executing the at least one execution action.

With reference to the fourth aspect or the first possible implementation manner of the fourth aspect or the second possible implementation manner of the fourth aspect, in a third possible implementation manner of the fourth aspect, the rule matching unit specifically is configured to: if one event meets one decision rule, acquire, according to the preset database, an execution action corresponding to the one decision rule, where the one event is any one event in the at least one event, and the one decision rule is any one decision rule in the preset database.

With reference to the fourth aspect or any one of the first possible implementation manner of the fourth aspect to the third possible implementation manner of the fourth aspect, in a fourth possible implementation manner of the fourth aspect, the real-time decision apparatus further includes: a selecting unit, configured to select the at least one execution action from the P execution actions.

With reference to the fourth possible implementation manner of the fourth aspect, in a fifth possible implementation manner of the fourth aspect, the selecting unit specifically is configured to: acquire, according to the preset database, a priority coefficient of each execution action in the P execution actions, where the preset database further includes at least one execution action and a priority coefficient corresponding to the at least one execution action; and select, according to the priority coefficient of each execution action, an execution action whose priority coefficient is greater than or equal to a preset threshold.

According to a fifth aspect, a complex event processing system is provided and includes: the complex event processing apparatus according to the third aspect or any one of the foregoing possible implementation manners; and the real-time decision apparatus according to the fourth aspect or any one of the foregoing possible implementation manners.

The embodiments of the present invention provide a complex event processing method, apparatus, and system, including: receiving an input event sent by an event source, where the input event is triggered at the event source by an object, and the input event includes an identifier of the object and an event type; acquiring, according to a preset database, M mode rules corresponding to the event type, where each mode rule includes one sending primary key, the preset database includes at least one event type and mode rules corresponding to the event type, and M is greater than or equal to 1; performing mode matching between the input event and the M mode rules separately to acquire N output events, where each output event includes a sending primary key in a mode rule for acquiring each output event, N is greater than or equal to 0, and N is less than or equal to M; and if N is greater than or equal to 1, sending at least one piece of event information to a real-time decision apparatus, where each piece of the event information includes Q output events and indication information, where the Q output events are output events that are included in the N output events and have a same sending primary key, Q is greater than or equal to 1, and the indication information includes the identifier of the object, so that the real-time decision apparatus is instructed to send execution information of an execution action to the object. On the one hand, because the complex event processing apparatus includes indication information into sent event information to instruct the real-time decision apparatus to send execution information of an execution action to an object, a system requiring a synchronous response can provide a synchronous response externally when performing complex event processing by using the complex event processing method provided by the present invention; on the other hand, because output events including a same sending primary key are included into a same piece of event information and sent to the real-time decision apparatus, the output events may be correlated, so that the real-time decision apparatus performs aggregation and centralized processing on the output events to avoid information flooding, thereby solving a problem in the prior art that a system requiring a synchronous response cannot provide a synchronous response externally when performing complex event processing or that information flooding is caused even if a CEP device is simply changed to a synchronous response device.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

CEP is to process an event sequence according to an event. That is, in processing of an event, events (context events of the event) correlated with the event are considered comprehensively, a comprehensive analysis is performed on the event and the events correlated with the event, and multi-dimensional analytical processing is performed to obtain multiple corresponding output events.

A real-time decision apparatus makes a synchronous decision on multiple events, and may match the received multiple events with rules to acquire execution actions corresponding to the multiple events and make a response.

Figure 1:
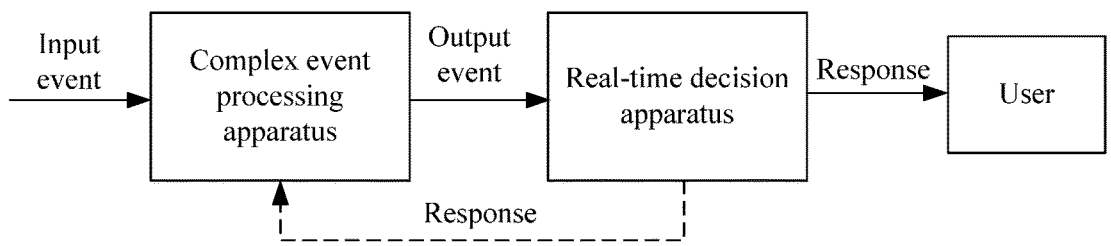
FIG. 1 is an architectural diagram of a network for complex event processing according to an embodiment of the present invention.

As shown in FIG. 1, which is an architectural diagram of a network for complex event processing, a real-time decision apparatus generally implements complex event processing by interacting with a complex event processing apparatus. First, the complex event processing apparatus performs CEP on an input event to acquire output events corresponding to the input event. Then the real-time decision apparatus matches the output events corresponding to the input event with simple rules to acquire an execution action corresponding to each input event in the output events corresponding to the input event, so that after CEP is performed on the same input event, multi-dimensional execution actions are obtained, and that the execution actions are fed back to a user directly or fed back to a user by using the complex event processing apparatus.

Embodiment 1

Figure 2:
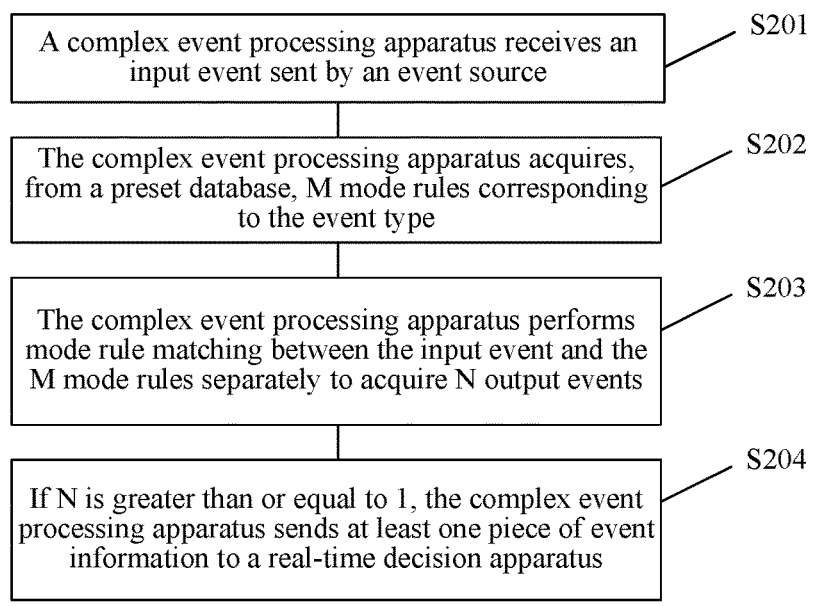
FIG. 2 is a schematic flowchart of a complex event processing method according to an embodiment of the present invention.

Embodiment 1 of the present invention provides a complex event processing method, applied to a complex event processing apparatus. As shown in FIG. 2, the method may include:

S201. A complex event processing apparatus receives an input event sent by an event source.

The input event is triggered at the event source by an object, and the input event includes an identifier of the object and an event type.

The object may be a user or a device. A unique object may be determined by using an identifier of the object. The identifier of the object may be an Internet Protocol (IP) address or a Media Access Control (MAC) address of a device, or may be a telephone number of a user, or may be any other identifier. The form of the identifier of the object is not specifically limited in the present invention.

The event type is a preset event classification attribute in a system, and may be represented by a character. The representation form of the event type is not limited in the present invention. Exemplarily, the event type may include "query and search", "watch", "download", and the like. It should be noted that the foregoing example is only an example for describing the event type, and is not a limitation on the event type.

Exemplarily, it is assumed that the object is user A; when user A opens a video by using an application (APP) 1 of the event source, the complex event processing apparatus may receive an input event 1: "user A watches a video by using APP1, an identifier of user A, and event type 1", sent by the APP1.

S202. The complex event processing apparatus acquires, according to a preset database, M mode rules corresponding to the event type.

Each mode rule includes one sending primary key, the preset database includes at least one event type and mode rules corresponding to the event type, and M is greater than or equal to 1.

A mode rule may include a condition that a preset input event may meet, which used as a rule for performing mode matching on an input event. When an input event meets a condition in a mode rule, an output event of the mode rule may be acquired.

A sending primary key, namely, a sending primary keyword, is a field, may be represented by a character, and may be used to determine a destination device to which the event needs to be sent.

It should be noted that one event type may correspond to one or more mode rules. In an actual application, a correspondence between an event type and a mode rule may be set according to an actual requirement. The correspondence between an event type and a mode rule is not specifically limited in the present invention Exemplarily, the preset database may be stored in a form of a table. Table 1 shows a preset database.

TABLE 1

| Event type | Mode rule |
|---|---|
| Event type 1 | Mode rule 1 and mode rule 2 |
| Event type 2 | Mode rule 1, mode rule 2, and mode rule 3 |
| Event type 3 | Mode rule 4, mode rule 5, and mode rule 6 |
| . . . | . . . |

It should also be noted that Table 1 is only an exemplary preset database in the form of a table, and is not a limitation on the form of the preset database. Certainly, the preset database may also be stored in another form, which is not limited in the present invention.

S203. The complex event processing apparatus performs mode matching between the input event and the M mode rules separately to acquire N output events.

Each output event includes a sending primary key in a mode rule for acquiring each output event, N is greater than or equal to 0, and N is less than or equal to M.

Specifically, the sending primary key included in each output event is the same as the sending primary key included in the mode rule for acquiring the output event.

Exemplarily, mode matching is performed between the input event 1 and the mode rule 1. Assuming that a sending primary key included in the mode rule 1 is a sending primary key 1, and that an output event 1 is acquired after mode matching is performed between the input event 1 and the mode rule 1, a sending primary key included in the output event 1 is also the sending primary key 1.

Further, when the input event matches a mode rule, an output event is acquired; when the input event does not match a mode rule, no output event can be acquired.

S204. If N is greater than or equal to 1, the complex event processing apparatus sends at least one piece of event information to a real-time decision apparatus.

Each piece of the event information includes Q output events and indication information, where the Q output events are output events that are included in the N output events and have a same sending primary key, Q is greater than or equal to 1, and the indication information includes the identifier of the object, so that the real-time decision apparatus is instructed to send execution information of an execution action to the object.

Exemplarily, it is assumed that in step S201, the complex event processing apparatus receives the input event 1: <event A, IP-A, and event type 1>, sent by the event source, where IP-A is the identifier of the object.

It should be noted that the foregoing form of the input event is only an example for description, and is not a specific limitation on the form of the input event.

The complex event processing apparatus acquires, according to the preset database, three mode rules corresponding to the event type 1, which marked as the mode rule 1, the mode rule 2, and the mode rule 3, respectively. It is assumed that sending primary keys in the mode rule 1, the mode rule 2, and the mode rule 3 are all the sending primary key 1.

The complex event processing apparatus performs mode matching between the input event 1 and the mode rule 1, and acquires the output event 1, where a sending primary key included in the output event 1 is the sending primary key 1.

After performing mode matching between the input event 1 and the mode rule 2, the complex event processing apparatus acquires no output event.

The complex event processing apparatus performs mode matching between the input event 1 and the mode rule 3, and acquires an output event 2, where a sending primary key included in the output event 2 is the sending primary key 1.

It can be known from the foregoing that after mode matching is performed between the input event 1 and the three acquired mode rules separately, N output events (output event 1 and output event 2), wherein N=2, are acquired. Because the two output events include the same second sending primary key, the output event 1 and the output event 2 may be included in a same piece of event information.

The complex event processing apparatus sends event information 1 to the real-time decision apparatus, where the event information 1 includes Q output events (output event 1 and output event 2), wherein Q=2, and indication information IP-A.

It should be noted that the event information may be in a form of signaling, or may be in a form of a message. The form of the event information is not specifically limited in the present invention. When the event information is in the form of signaling, the signaling may be existing signaling, or may be newly set signaling. The signaling type of the event information is also not specifically limited in the present invention.

This embodiment of the present invention provides a complex event processing method, including: receiving an input event sent by an event source, where the input event is triggered at the event source by an object, and the input event includes an identifier of the object and an event type; acquiring, according to a preset database, M mode rules corresponding to the event type, where each mode rule includes one sending primary key, the preset database includes at least one event type and mode rules corresponding to the event type, and M is greater than or equal to 1; performing mode matching between the input event and the M mode rules separately to acquire N output events, where each output event includes a sending primary key in a mode rule for acquiring each output event, N is greater than or equal to 0, and N is less than or equal to M; and if N is greater than or equal to 1, sending at least one piece of event information to a real-time decision apparatus, where each piece of the event information includes Q output events and indication information, where the Q output events are output events that are included in the N output events and have a same sending primary key, Q is greater than or equal to 1, and the indication information includes the identifier of the object, so that the real-time decision apparatus is instructed to send execution information of an execution action to the object. On the one hand, because a complex event processing apparatus includes indication information into sent event information to instruct a real-time decision apparatus to send execution information of an execution action to an object, a system requiring a synchronous response can provide a synchronous response externally when performing complex event processing by using the complex event processing method provided by the present invention; on the other hand, because output events including a same sending primary key are included into a same piece of event information and sent to the real-time decision apparatus, the output events may be correlated, so that the real-time decision apparatus performs aggregation and centralized processing on the output events to avoid information flooding, thereby solving a problem in the prior art that a system requiring a synchronous response cannot provide a synchronous response externally when performing complex event processing or that information flooding is caused even if a CEP device is simply changed to a synchronous response device.

Embodiment 2

Figure 3:
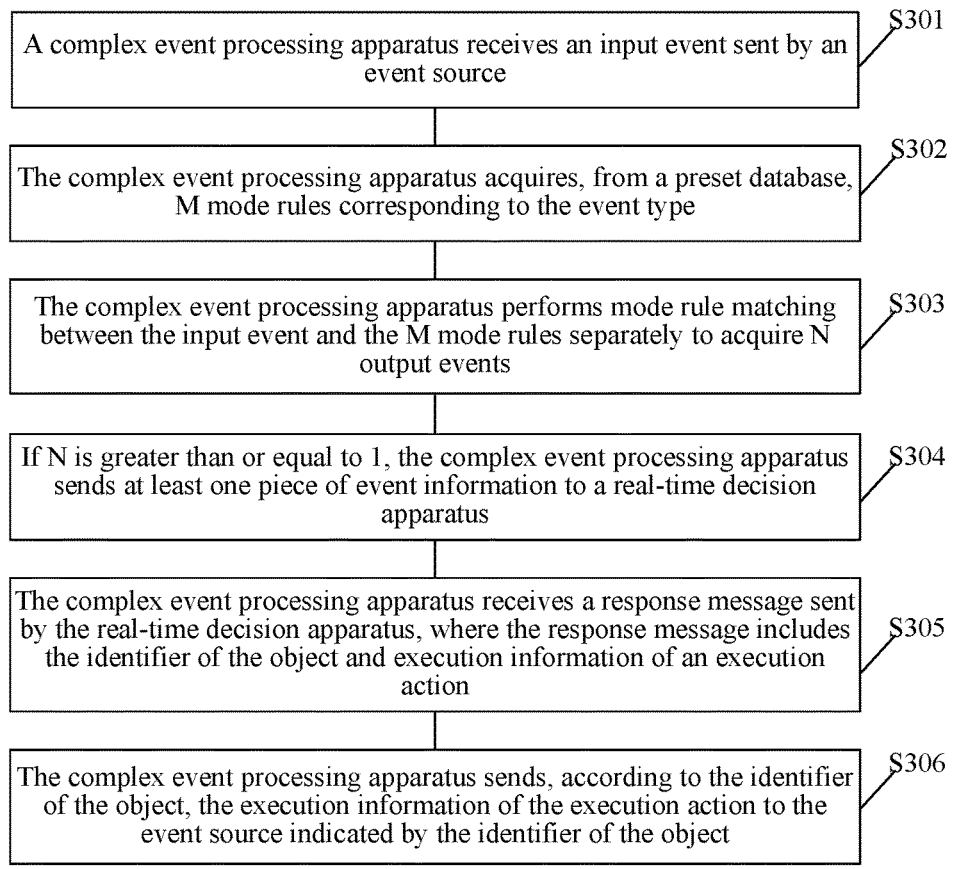
FIG. 3 is a schematic flowchart of another complex event processing method according to an embodiment of the present invention.

Embodiment 2 of the present invention provides a complex event processing method. As shown in FIG. 3, the method may include:

S301. A complex event processing apparatus receives an input event sent by an event source.

The input event is triggered at the event source by an object, and the input event includes an identifier of the object and an event type.

It should be noted that the process of step S301 is the same as that of step S201 and is not further described herein.

S302. The complex event processing apparatus acquires, according to a preset database, M mode rules corresponding to the event type.

Each mode rule includes one sending primary key, the preset database includes at least one event type and mode rules corresponding to the event type, and M is greater than or equal to 1.

It should be noted that the process of step S302 is the same as that of step S202 and is not further described herein.

S303. The complex event processing apparatus performs mode matching between the input event and the M mode rules separately to acquire N output events.

Each output event includes a sending primary key in a mode rule for acquiring each output event, N is greater than or equal to 0, and N is less than or equal to M.

Further, the mode rule may further include a mode matching primary key, an execution condition, and an event.

The mode matching primary key included in the mode rule is a primary keyword for performing mode matching, is a field, and may be represented by a character.

The execution condition included in the mode rule is a decision condition for performing mode matching.

Exemplarily, the execution condition may be "a traffic volume of videos watched by a user by using APP-A within a month is greater than one gigabyte (GB), or "a user watches a video via the 4th generation mobile communications technology (4G) network", or the like.

The event included in the mode rule is a preset output event when the input event matches the mode rule.

Specifically, performing mode matching between the input event and the M mode rules separately to acquire N output events may include but is not limited to the following two cases.

Case 1: The complex event processing apparatus includes only one mode matching module.

Specifically, in case 1, the performing mode matching between the input event and the M mode rules separately to acquire N output events may include: if it is determined, according to a mode matching primary key in a first mode rule, that an execution condition in the first mode rule may be met, acquiring an output event of the first mode rule, where the output event of the first mode rule includes a sending primary key and an event in the first mode rule, and the first mode rule is any one of the M mode rules; or if it is determined, according to a mode matching primary key in a second mode rule, that an execution condition in the second mode rule is not met, generating no output event, where the second mode rule is any one of the M mode rules.

Case 2: The complex event processing apparatus includes at least two mode matching modules.

Specifically, in case 2, the performing mode matching between the input event and the M mode rules separately to acquire N output events may be implemented by step A, step B, and step C.

Step A: The complex event processing apparatus allocates the input event to P mode matching modules separately according to the sending primary key included in each mode rule in the M mode rules.

The P mode matching modules are mode matching modules that are in the at least two mode matching modules and corresponding to the sending primary key included in each mode rule in the M mode rules in the preset database, and the preset database further includes at least one sending primary key and a mode matching module corresponding to the at least one sending primary key.

Optionally, a correspondence between a sending primary key and a mode matching module is a preset processing relationship; and a mode matching module may perform mode matching only on a mode rule that includes a sending primary key corresponding to the mode matching module.

Optionally, multiple sending primary keys may correspond to a same mode matching module. In an actual application, the correspondence between a sending primary key and a mode matching module may be set according to an actual requirement. The correspondence between a sending primary key and a mode matching module is not specifically limited in the present invention.

Exemplarily, the preset database may be stored in a form of a table. Table 2 shows a preset database.

TABLE 2

| Mode matching module | Sending primary key |
| --- | --- |
| Mode matching module 1 | Sending primary key 1 and sending primary key 4 |
| Mode matching module 2 | Sending primary key 2 |
| Mode matching module 3 | Sending primary key 3 and sending primary key 5 |
| . . . | . . . |

It should be noted that Table 2 is only an exemplary preset database in the form of a table, and is not a limitation on the form of the preset database. Certainly, the preset database may also be stored in another form, which is not limited in the present invention.

It should also be noted that the preset database shown in Table 2 and the preset database shown in Table 1 may be a same physical database, or may be different physical databases, which is not specifically limited in the present invention.

Exemplarily, assuming that the complex event processing apparatus receives an input event 1, where an event type included in the input event 1 is an event type 3, the complex event processing apparatus acquires, according to the preset database shown in Table 1, the mode rule 4, mode rule 5, and mode rule 6 corresponding to the event type 3.

Assuming that sending primary keys included in the mode rule 4 and mode rule 5 are both "the sending primary key 5", the complex event processing apparatus allocates the input event 1 to the mode matching module 3 according to the correspondence shown in Table 2.

Assuming that a sending primary key included in the mode rule 6 is "the sending primary key 1", the complex event processing apparatus allocates the input event 1 to the mode matching module 1 according to the correspondence shown in Table 2.

It can be known from the foregoing that the complex event processing apparatus allocates the input event to P mode matching modules (mode matching module 1 and mode matching module 3) separately according to the sending primary key included in each mode rule in the M mode rules (mode rule 4, mode rule 5, and mode rule 6), wherein P=2 and M=3.

Step B: Each mode matching module in the P mode matching modules acquires, by separately filtering the M mode rules, mode rules having sending primary keys corresponding to the mode matching module itself in the preset database.

Exemplarily, assuming that the mode matching module 1 receives the input event 1, where the event type included in the input event 1 is the event type 3, the mode matching module 1 acquires, according to the event type 3 and the preset database shown in Table 1, the mode rule 4, mode rule 5, and mode rule 6 corresponding to the event type 3.

It is assumed that the sending primary key included in the mode rule 4 is the sending primary key 2, and that the sending primary key included in the mode rule 5 is the sending primary key 3, and that the sending primary key included in the mode rule 6 is the sending primary key 4.

As shown in Table 2, because the mode matching module 1 corresponds to the sending primary key 1 and the sending primary key 4, the mode matching module 1 acquires, by filtering M mode rules, wherein $M=_3$, the mode rule 6 that has a sending primary key corresponds to the mode matching module 1 in the preset database shown in Table 2.

Step C: Each mode matching module in the P mode matching modules performs mode matching between the input event and the mode rules corresponding to the mode matching module separately to acquire the N output events.

Specifically, that each mode matching module in the P mode matching modules performs mode matching between the input event and the mode rules corresponding to the mode matching module separately to acquire the N output events includes: if it is determined, according to a mode matching primary key in a third mode rule, that an execution condition in the third mode rule may be met, acquiring an output event of the third mode rule, where the output event of the third mode rule includes a sending primary key in the third mode rule and an event, and the third mode rule is any one of the mode rules corresponding to the mode matching module; or if it is determined, according to a mode matching primary key in a fourth mode rule, that an execution condition in the fourth mode rule is not met, generating no output event, where the fourth mode rule is any one of the mode rules corresponding to the mode matching module.

The following uses an example to describe the process of performing mode matching between the input event and the mode rules.

Exemplarily, it is assumed that the received input event 1 is "user A watches a video by using APP-A, an identifier of user A, and event type 1"; a mode matching primary key in a mode rule 1 is "user identifier+APP identifier", an execution condition included in the mode rule 1 is "the traffic volume of videos watched by the user by using APP-A within a month is greater than 1 GB", and an event included in the mode rule 1 is "the traffic volume of videos watched by the user by using APP-A within a month exceeds 1 GB";

Performing mode matching between the input event 1 and the mode rule 1 includes: querying a context of the input event 1 according to the mode matching primary key "user identifier+APP identifier", acquiring that the traffic volume of videos watched by the user A by using APP-A within a month is 1.2 GB, and therefore determining that the execution condition in the mode rule 1 (the traffic volume of videos watched by the user by using APP-A within a month is greater than 1 GB) may be met, and acquiring an output event, "the traffic volume of videos watched by the user by using APP-A within a month exceeds 1 GB", of the mode rule 1.

The context of the input event refers to input events correlated with the input event.

It should be noted that the foregoing example is only a form of an example used to describe the process of matching between the input event and the mode rules, and is not a specific limitation on the process.

S304. If N is greater than or equal to 1, the complex event processing apparatus sends at least one piece of event information to a real-time decision apparatus.

Each piece of the event information includes Q output events and indication information, where the Q output events are output events that are included in the N output events and have a same sending primary key, Q is greater than or equal to 1, and the indication information includes the identifier of the object, so that the real-time decision apparatus is instructed to send execution information of an execution action to the object.

Further, the indication information may further include an identifier of the complex event processing apparatus. Optionally, the identifier of the complex event processing apparatus may be an identifier of a routing unit in the complex event processing apparatus.

The identifier of the complex event processing apparatus is used to uniquely identify a complex event processing apparatus. The identifier of the complex event processing apparatus may be a MAC address or an IP address of the complex event processing apparatus, or a number allocated by a system to the complex event processing apparatus, which is not specifically limited in the present invention. Any identifier that can be used to uniquely identify the complex event processing apparatus falls within the protection scope of the present invention.

Specifically, content included in the indication information may vary according to different types of event sources indicated by the identifier of the object included in the input event. The following two cases may be included.

Case 1: The type of the event source indicated by the identifier of the object is a direct contact user, and the indication information includes the identifier of the object and the identifier of the complex event processing apparatus.

Exemplarily, if the identifier of the object is an IP address or a MAC address, the type of the event source indicated by the identifier of the object is a direct contact user. In this case, the indication information includes the identifier of the object and the identifier of the complex event processing apparatus.

Case 2: The type of the event source indicated by the identifier of the object is an indirect contact user, and the indication information includes the identifier of the object.

Exemplarily, if the identifier of the object is a telephone number of a user, the type of the event source indicated by the identifier of the object is an indirect contact user. In this case, the indication information includes the identifier of the object.

The following uses an example to describe in detail the foregoing steps S301 to S304.

Exemplarily, it is assumed that the complex event processing apparatus includes five mode matching modules, and that the input event 1 sent by the event source (APP-A) and received by the complex event processing apparatus is "user A watches a video by using APP-A, IP-A, and event type 1".

The complex event processing apparatus acquires, according to the preset database, three mode rules corresponding to the event type 1, which are marked as the mode rule 1, the mode rule 2, and the mode rule 3, respectively. Content of the three mode rules is shown in Table 3.

TABLE 3

| Mode rule | Execution condition | Sending primary key | Mode matching primary key | Output event |
| --- | --- | --- | --- | --- |
| Mode rule 1 | The user watches a video via the 4 G network. | User name | User name | The user watches a video through the 4 G network. |
| Mode rule 2 | The user watches a video continuously for more than three hours. | User name + TIME | User name + TIME | The user watches a video continuously for more than three hours. |
| Mode rule 3 | The traffic volume of videos watched by the user by using APP-A within a month is greater than 1 GB. | User name | User name + APP identifier | The traffic volume of videos watched by the user by using APP-A within a month is greater than 1 GB. |

It is further assumed that in the preset database, the mode matching module corresponding to the sending primary key "user A" is the mode matching module 1, and that the mode matching module corresponding to the sending primary key "user A+TIME" is the mode matching module 2. Therefore, the complex event processing apparatus sends the input event 1 to the mode matching module 1 and the mode matching module 2.

After the input event 1 is received, the corresponding rules acquired according to the preset database by the mode matching module 1 according to the event type 1 are respectively the mode rule 1, the mode rule 2, and the mode rule 3.

The mode matching module 1, by querying the preset database, acquires that the sending primary key corresponding to the mode matching module 1 is only "user A". Therefore, the mode matching module 1 filters out the mode rule 2 from the mode rule 1, the mode rule 2, and the mode rule 3 to acquire the mode rule 1 and the mode rule 3.

The mode matching module 1 queries the context of the input event 1 according to the mode matching primary key in the mode rule 1, acquires that user A watches a video via the 4G network, determines that the execution condition in the mode rule 1 (the user watches a video via the 4G network) may be met, and therefore acquires the output event 1, "the user watches a video via the 4G network", of the mode rule 1.

The mode matching module 1 queries the context of the input event 1 according to the mode matching primary key in the mode rule 1, acquires that the traffic volume of videos watched by user A by using APP-A within a month is 2 GB, determines that the execution condition in the mode rule 3 (the traffic volume of videos watched by the user by using APP-A within a month is greater than 1 GB) may be met, and therefore acquires the output event 2, "the traffic volume of videos watched by the user by using APP-A within a month is greater than 1 GB", of the mode rule 3.

It can be known from the foregoing that the output events acquired by the mode matching module 1 are respectively the output event 1 and the output event 2.

Further, the mode matching module 1 sends event information to the real-time decision apparatus, where the event information includes the output event 1, the output event 2, and the identifier IP-A of user A.

It should be noted that the processing in the mode matching module 2 is similar to the processing in the mode matching module 1, and is not further described herein.

Further, if the type of the event source is a direct contact user, the indication information includes the identifier of the object and the identifier of the complex event processing apparatus, and after step S304, the method may further include steps S305 and S306.

S305. The complex event processing apparatus receives a response message sent by the real-time decision apparatus, where the response message includes the identifier of the object and execution information of an execution action.

Optionally, the execution action may be sending a notification message to the user, recommending information to the user, sending alarm information to the user, or the like, which is not specifically limited in the present invention.

Preferably, the routing unit in the complex event processing apparatus receives the response message sent by the real-time decision apparatus.

Exemplarily, assuming that the execution action acquired by the real-time decision apparatus is "recommending a 1 GB traffic package", the complex event processing apparatus may receive a response message <Reply with 1001 to subscribe to a 1 GB traffic package, user identifier A>.

It should also be noted that the response message may be in a form of signaling, or may be in a form of a message. The form of the response message is not specifically limited in the present invention. When the response message is in the form of signaling, the signaling may be existing signaling, or may be newly set signaling. The signaling type of the response message is also not specifically limited in the present invention.

S306. The complex event processing apparatus sends, according to the identifier of the object, the execution information of the execution action to the event source indicated by the identifier of the object.

Further, before step S301, the method may further include: the complex event processing apparatus receives configuration information, where the configuration information includes at least one piece of the following information: event definition information and rule definition information.

Optionally, the configuration information may be preset information input by an administrator, and is used to define information exchanged between apparatuses during system running, so that a unified definition and consistent parsing are implemented by the apparatuses in the system to further improve efficiency.

Specifically, the event definition defines multiple aspects such as formats, parameters, and meanings of events in a unified manner, so that an apparatus receiving an event can parse the event. The rule definition defines multiple aspects such as formats, parameters, and meanings of rules in a unified manner and establishes a correspondence between a rule and an event type, and the like, so that the apparatuses can parse the rules.

Exemplarily, the event definition may be as follows:

Event VideoBrowse (user:String, appid:String, videoed:String, usage:Int) partition by (user)

Event p_VideoBrowse (user:String, appid:String, videoed:String) partition by (user)

Event p_QiyiBrowse(user:String, appid:String, videoed:String, usage:Int) partition by (user, appid).

Exemplarily, the rule definition may be as follows:

Select VideoBrowse(@user=$user)

Select at least 1 VideoBrowse (@user=$user, @appid=$appid) within 1 month check sum((@usage)> 1024.

It should be noted that the foregoing event definition and rule definition are only exemplary forms showing a manner of defining events and rules, and are not limitations on the content and form of the event definition and rule definition. In an actual application process, events and rules may be defined according to actual requirements, and are not specifically limited in the present invention, so long as definitions in the entire system are consistent.

This embodiment of the present invention provides a complex event processing method, including: receiving an input event sent by an event source, where the input event is triggered at the event source by an object, and the input event includes an identifier of the object and an event type; acquiring, according to a preset database, M mode rules corresponding to the event type, where each mode rule includes one sending primary key, the preset database includes at least one event type and mode rules corresponding to the event type, and M is greater than or equal to 1; performing mode matching between the input event and the M mode rules separately to acquire N output events, where each output event includes a sending primary key in a mode rule for acquiring each output event, N is greater than or equal to 0, and N is less than or equal to M; and if N is greater than or equal to 1, sending at least one piece of event information to a real-time decision apparatus, where each piece of the event information includes Q output events and indication information, where the Q output events are output events that are included in the N output events and have a same sending primary key, Q is greater than or equal to 1, and the indication information includes the identifier of the object, so that the real-time decision apparatus is instructed to send execution information of an execution action to the object. On the one hand, because a complex event processing apparatus includes indication information into sent event information to instruct the real-time decision apparatus to send execution information of an execution action to an object, and when the indication information includes an identifier of the complex event processing apparatus and an identifier of the object, receives a response message sent by the real-time decision apparatus, where the response message includes the identifier of the object, and sends execution information of an execution action to the event source indicated by the identifier of the object, a system requiring a synchronous response can provide a synchronous response externally when performing complex event processing by using the complex event processing method provided by the present invention; on the other hand, because output events including a same sending primary key are included into a same piece of event information and sent to the real-time decision apparatus, the output events may be correlated, so that the real-time decision apparatus performs aggregation and centralized processing on the output events to avoid information flooding, thereby solving a problem in the prior art that a system requiring a synchronous response cannot provide a synchronous response externally when performing complex event processing or that information flooding is caused even if a CEP device is simply changed to a synchronous response device.

Embodiment 3

Figure 4:
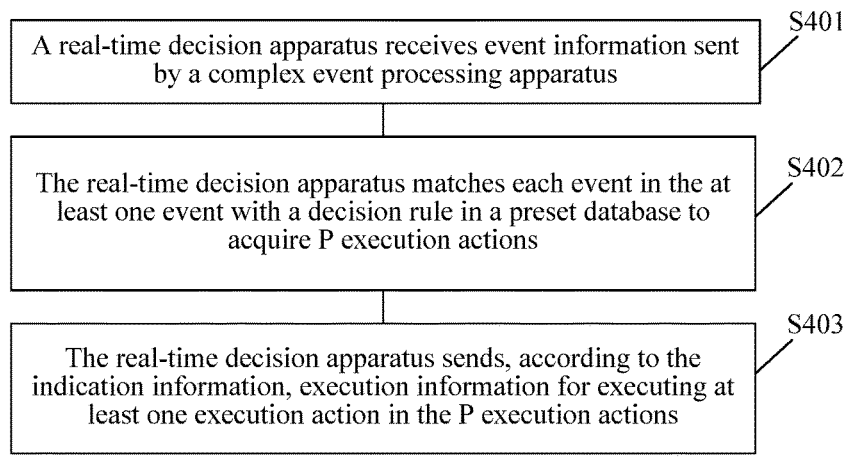
FIG. 4 is a schematic flowchart of still another complex event processing method according to an embodiment of the present invention.

Embodiment 3 of the present invention provides a complex event processing method, applied to a real-time decision apparatus. As shown in FIG. 4, the method may include:

S401. A real-time decision apparatus receives event information sent by a complex event processing apparatus.

The event information includes at least one event and indication information.

S402. The real-time decision apparatus matches each event in the at least one event with decision rules in a preset database separately to acquire P execution actions, where P is greater than or equal to 1, and the preset database includes at least one decision rule and an execution action corresponding to the at least one decision rule.

The decision rule is a preset decision condition for performing decision rule matching.

Exemplarily, the preset database may be stored in a form of a table. Table 4 shows a preset database.

TABLE 4

| Decision rule | Execution action |
| --- | --- |
| Decision rule 1 | Execution action 1 |
| Decision rule 2 | Execution action 2 |
| Decision rule 3 | Execution action 3 |
| . . . | . . . |

It should be noted that Table 4 is only an exemplary preset database in the form of a table, and is not a limitation on the form of the preset database. Certainly, the preset database may also be stored in another form, which is not limited in the present invention.

It should also be noted that the preset database shown in Table 4 and the preset databases shown in Table 1 and Table 2 may be a same physical database, or may be different physical databases, which is not specifically limited in the present invention.

It should also be noted that in an actual application process, an execution action corresponding to each decision rule may be set according to an actual requirement. A correspondence between decision rules and an execution action is not specifically limited in the present invention.

Specifically, decision rule matching refers to traversing all preset rules according to an event to determine, one by one, whether the preset rules are met.

Specifically, that the real-time decision apparatus matches each event in the at least one event with decision rules in a preset database separately to acquire P execution actions may be implemented by using the following method: if one event meets one decision rule, acquiring, according to the preset database, an execution action corresponding to the one decision rule, where the one event is any one event in the at least one event, and the one decision rule is any one decision rule in the preset database.

S403. The real-time decision apparatus sends, according to the indication information, execution information for executing at least one execution action in the P execution actions.

This embodiment of the present invention provides a complex event processing method, including: receiving event information sent by a complex event processing apparatus, where the event information includes at least one event and indication information; matching each event in the at least one event with decision rules in a preset database separately to acquire P execution actions; and sending, according to the indication information, execution information for executing at least one execution action in the P execution actions. On the one hand, because indication information is included in event information sent by the complex event processing apparatus and received by the real-time decision apparatus, and the real-time decision apparatus sends, according to the indication information, execution information for executing at least one execution action in P execution actions to an object, the real-time decision apparatus provides a synchronous response externally when performing complex event processing in cooperation with the complex event processing apparatus; on the other hand, because output events including a same sending primary key are included into a same piece of event information and sent to the real-time decision apparatus, the output events may be correlated, so that the real-time decision apparatus performs aggregation and centralized processing on the output events to avoid information flooding, thereby solving a problem in the prior art that a system requiring a synchronous response cannot provide a synchronous response externally when performing complex event processing or that information flooding is caused even if a CEP device is simply changed to a synchronous response device.

Embodiment 4

Figure 5:
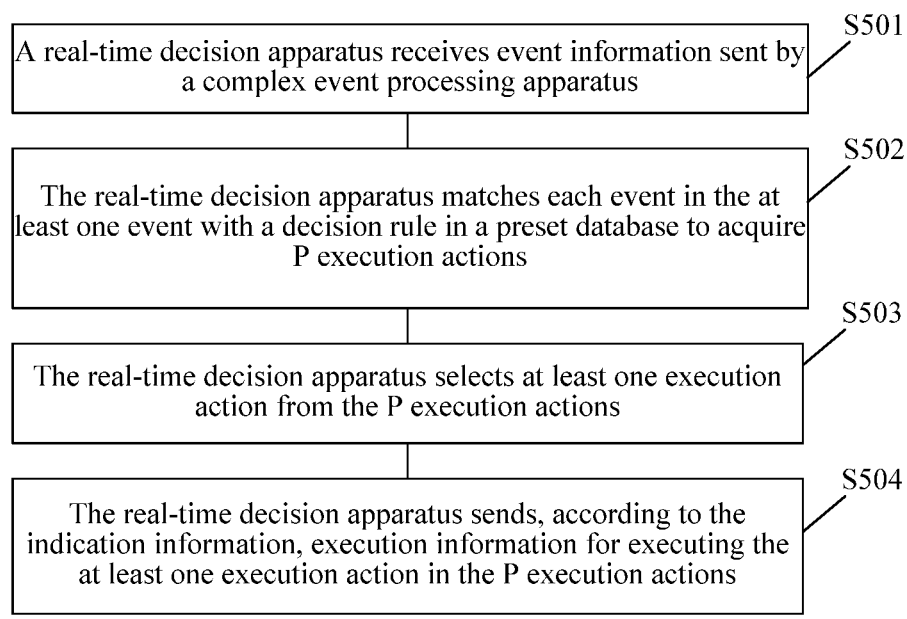
FIG. 5 is a schematic flowchart of yet another complex event processing method according to an embodiment of the present invention.

Embodiment 4 of the present invention provides a complex event processing method, applied to a real-time decision apparatus. As shown in FIG. 5, the method may include:

S501. A real-time decision apparatus receives event information sent by a complex event processing apparatus, where the event information includes at least one event and indication information.

S502. The real-time decision apparatus matches each event in the at least one event with decision rules in a preset database separately to acquire P execution actions, where P is greater than or equal to 1, and the preset database includes at least one decision rule and an execution action corresponding to the at least one decision rule.

It should be noted that the execution process of step S502 is the same as that of step S402 and is not further described herein.

S503. The real-time decision apparatus selects at least one execution action from the P execution actions.

Optionally, that the real-time decision apparatus selects at least one execution action from the P execution actions may be implemented by step A and step B:

Step A: Acquire, according to the preset database, a priority coefficient of each execution action in the P execution actions.

The preset database includes at least one execution action and a priority coefficient corresponding to the at least one execution action.

Exemplarily, the preset database may be stored in a form of a table. Table 5 and Table 6 show two different preset databases.

TABLE 5

| Execution action | Priority coefficient |
| --- | --- |
| Execution action 1 | 4 |
| Execution action 2 | 2 |
| Execution action 3 | 3 |
| ... | ... |

TABLE 6

| | Dimension 1 (weight 0.2) | Dimension 2 (weight 0.3) | Dimension 3 (weight 0.4) | Dimension 4 (weight 0.1) |
| --- | --- | --- | --- | --- |
| Execution action 1 | 5 | 4 | 3 | 6 |
| Execution action 2 | 2 | 5 | 6 | 1 |
| Execution action 3 | 3 | 8 | 9 | 2 |
| ... | ... | ... | ... | ... |

For the preset database shown in Table 5, table look-up may be directly performed according to an execution action to acquire a priority coefficient of the execution action; for the database shown in Table 6, weighted summation may be performed on evaluation scores in all evaluation dimensions according to an execution action to acquire a priority coefficient of the execution action.

Exemplarily, for the execution action 1, a priority coefficient of the execution action 1 is 4 according to the preset database shown in Table 5; for the execution action 1, a priority coefficient of the execution action 1 is 5*0.2+4*0.3+3*0.4+6*0.1=4 according to the preset database shown in Table 6.

It should be noted that Table 5 or Table 6 is only an exemplary preset database in the form of a table, and is not a limitation on the form and content of the preset database; when the preset database uses the form shown in Table 6, an evaluation dimension for an execution action may be set according to an actual requirement, which is not specifically limited in the present invention.

It should also be noted that the preset databases shown in Table 1, Table 2, Table 4, Table 5, and Table 6 may be a same physical database, or may be different physical databases.

It should also be noted that in an actual application, a priority of an execution action may be set according to an actual requirement. Setting of a priority of an execution action is not specifically limited in the present invention.

Step B: Select, according to the priority coefficient of each execution action, an execution action whose priority coefficient is greater than or equal to a preset threshold.

It should be noted that in an actual application, a value of the preset threshold may be set according to an actual requirement. A specific value of the preset threshold is not limited in the present invention.

Exemplarily, it is assumed that the real-time decision apparatus receives event information A <event 1, event 2, event 3, event 4, and IP-A> in step S501.

The real-time decision apparatus matches the four events included in the event information A with preset decision rules, where the four events meet decision rules 1, decision rules 2, decision rules 3, and decision rules 4; acquires, according to the preset database, execution actions corresponding to the decision rule 1, the decision rule 2, the decision rule 3, and the decision rule 4, which are marked as an execution action 1, an execution action 2, an execution action 3, and an execution action 4, respectively.

The real-time decision apparatus queries the preset database to acquire priorities of the four actions, which are 2, 4, 5, and 3 respectively.

Assuming that the preset threshold is 4, execution actions: execution action 2 and execution action 3, whose priority coefficients are greater than or equal to the preset threshold are selected.

S504. The real-time decision apparatus sends, according to the indication information, execution information for executing the at least one execution action in the P execution actions.

Specifically, according to different content included in the indication information, the process in which the real-time decision apparatus sends, according to the indication information, the execution information for executing the at least one execution action in the P execution actions, may include the following two cases:

Case 1: The indication information includes an identifier of an object: send, according to the identifier of the object, the execution information for executing the at least one execution action to the object, where a channel which the identifier of the object indicates may include an SMS channel, a WeChat channel, an email channel, or the like.

Exemplarily, assuming that the indication information includes a telephone number (12345) of the object, the execution information for executing the at least one execution action is sent to a terminal having the telephone number 12345.

Case 2: The indication information includes an identifier of an object and an identifier of the complex event processing apparatus: send a response message to the complex event processing apparatus according to the identifier of the complex event processing apparatus, where the response message includes the identifier of the object and the execution information for executing the at least one execution action.

Further, before step S501, the method may further include: the real-time decision apparatus receives configuration information, where the configuration information includes at least one piece of the following information: event definition information, rule definition information, and execution action definition information.

The execution action definition information refers to a unified definition of multiple aspects such as formats, parameters, or meanings of execution actions, so that different apparatuses parse the execution actions.

It should be noted that the event definition information and rule definition information are described in detail in Embodiment 2 and are not further described herein.

This embodiment of the present invention provides a complex event processing method, including: receiving event information sent by a complex event processing apparatus, where the event information includes at least one event and indication information; matching each event in the at least one event with decision rules in a preset database separately to acquire P execution actions, where P is greater than or equal to 1, and the preset database includes at least one decision rule and an execution action corresponding to the at least one decision rule; and sending, according to the indication information, execution information for executing at least one execution action in the P execution actions. On the one hand, because the complex event processing apparatus includes indication information into sent event information to instruct the real-time decision apparatus to send execution information of an execution action to an object, a system requiring a synchronous response can provide a synchronous response externally when performing complex event processing by using the complex event processing method provided by the present invention; on the other hand, because output events including a same sending primary key are included into a same piece of event information and sent to the real-time decision apparatus, the output events may be correlated, so that the real-time decision apparatus performs aggregation and centralized processing on the output events to avoid information flooding, thereby solving a problem in the prior art that a system requiring a synchronous response cannot provide a synchronous response externally when performing complex event processing or that information flooding is caused even if a CEP device is simply changed to a synchronous response device.

Embodiment 5

Embodiment 5 of the present invention provides a complex event processing method.

It is assumed that user A opens a video by using APP-A through the 4G network; it is assumed that an IP address of a device used by user A is IP-A, and that a traffic volume of videos watched by user A by using APP-A within this month is 1.4 GB; and it is further assumed that when a priority coefficient of an execution action is greater than or equal to 4, a real-time decision apparatus selects the execution action.

It is assumed that a routing unit 1 in a complex event processing apparatus is a routing unit corresponding to an event source 1 (APP-A), and that an IP address of the routing unit 1 is IP-B; it is assumed that an event definition, a rule definition, and an execution action definition have been performed on each apparatus in a system.

Figure 6:
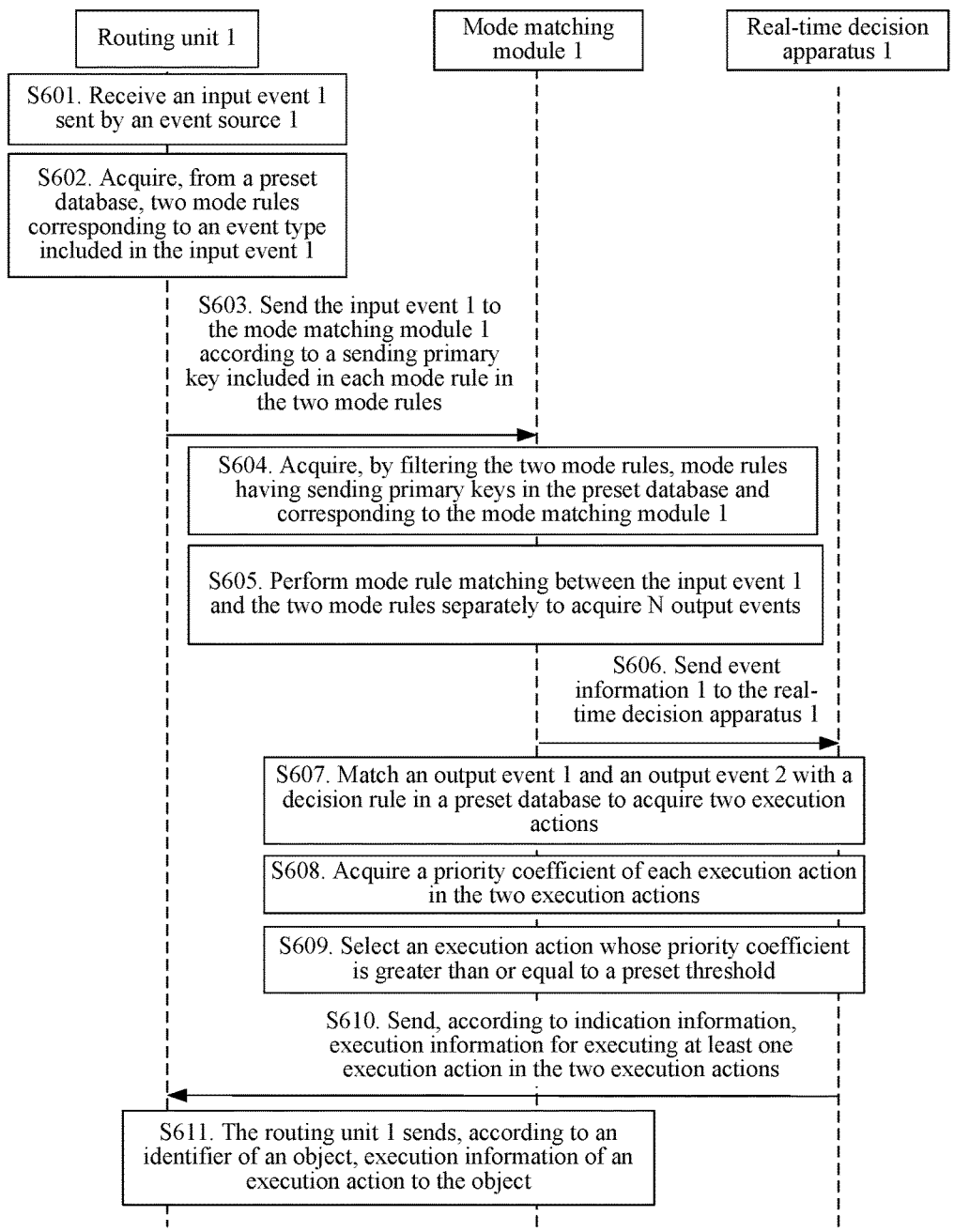
FIG. 6 is a schematic flowchart of another complex event processing method according to an embodiment of the present invention.

The methods shown in FIG. 3 and FIG. 5 are hereinafter described by using processing of an input event as an example, where the routing unit 1 and a mode matching module corresponding to the routing unit 1 and a real-time decision apparatus 1 process an input event sent by the event source 1. As shown in FIG. 6, the method may include:

S601. The routing unit 1 receives an input event 1 sent by the event source 1.

Exemplarily, the input event 1 received by the routing unit 1 is: "user A watches a video by using APP-A, and type 1".

S602. The routing unit 1 acquires, according to a preset database, two mode rules corresponding to an event type included in the input event 1.

Exemplarily, the routing unit 1 queries the preset database, and acquires two mode rules: the mode rule 1 and the mode rule 2, corresponding to the event type 1.

Content of the mode rule 1 and mode rule 2 is shown in Table 7:

TABLE 7

| Mode rule | Execution condition | Sending primary key | Mode matching primary key | Output event |
|---|---|---|---|---|
| Mode rule 1 | The user watches a video via the 4 G network. | User name | User name | The user watches a video via the 4 G network. |
| Mode rule 2 | The traffic volume of videos watched by the user by using APP-A within a month is greater than 1 GB. | User name | User name + APP identifier | The traffic volume of videos watched by the user by using APP-A within a month is greater than 1 GB. |

S603. The routing unit 1 sends the input event 1 to the mode matching module 1 according to a sending primary key included in each mode rule in the two mode rules.

Exemplarily, on a basis of the example in step S602, the sending primary key included in the mode rule corresponding to the input event 1 includes only one sending primary key, which is "user name".

Assuming that the sending primary key corresponding to the mode matching module 1 is "user name", the routing unit 1 sends the input event 1 to the mode matching module 1.

S604. The mode matching module 1 acquires, by filtering the two mode rules, mode rules having sending primary keys corresponding to the mode matching module 1 in the preset database.

Exemplarily, on a basis of the example in step S603, because the sending primary key corresponding to the mode matching module 1 is "user name", the sending primary keys included in the mode rule 1 and the mode rule 2 are also "user name", the mode matching module 1 acquires the mode rule 1 and the mode rule 2.

S605. The mode matching module 1 performs mode matching between the input event 1 and the two mode rules separately to acquire N output events.

Exemplarily, on a basis of the example in step S604, the mode matching module 1 performs mode matching between the input event 1 and the two mode rules (mode rule 1 and mode rule 2) separately.

The mode matching module 1 queries a context of the input event 1 according to the mode matching primary key "user name" in the mode rule 1, acquires that user A watches a video via the 4G network, determines that the execution condition in the mode rule 1 (the user watches a video via the 4G network) may be met, and therefore acquires an output event 1, "the user watches a video via the 4G network", of the mode rule 1.

The mode matching module 1 then acquires, according to the mode matching primary key "user name+APP identifier" in the mode rule 2, that the traffic volume of videos watched by user A by using APP-A within a month is 1.4 GB, determines that the execution condition in the mode rule 2 (the traffic volume of videos watched by the user by using APP-A within a month is greater than 1 GB) may be met, and therefore acquires an output event 2 of the mode rule 2, "the traffic volume of videos watched by the user by using APP-A within a month is greater than 1 GB".

It can be known from the foregoing that after the mode matching module 1 performs mode matching between the input event 1 and the two mode matching rules separately, N output events, namely, the output event 1 and the output event 2, are acquired, wherein N=2.

It should be noted that the mode matching module may perform mode matching between the input event and multiple mode rules in sequence or simultaneously, which is not specifically limited in the present invention.

S606. The mode matching module 1 sends event information 1 to the real-time decision apparatus 1.

Exemplarily, on a basis of the example in step S605, the mode matching module 1 sends event information 1<output event 1, output event 2, IP-A, and IP-B> to the real-time decision apparatus 1.

S607. The real-time decision apparatus matches an output event 1 and an output event 2 with decision rules in a preset database to acquire two execution actions.

Exemplarily, on a basis of the example in step S606, the real-time decision apparatus 1 matches the output event 1 with decision rules in the preset database to acquire an execution action 1: "recommending similar videos to the user".

The real-time decision apparatus 1 matches the output event 2 with the decision rule in the preset database to acquire an execution action 2: "recommending a directed traffic package of videos to the user".

S608. The real-time decision apparatus 1 acquires a priority coefficient of each execution action in the two execution actions.

Exemplarily, on a basis of the example in step S607, the real-time decision apparatus 1 acquires, according to the preset database, that a priority coefficient of the execution action 1 is 3, and that a priority coefficient of the execution action 2 is 5.

S609. The real-time decision apparatus 1 selects an execution action whose priority coefficient is greater than or equal to a preset threshold.

Exemplarily, on a basis of the example in step S608, because the preset threshold of the execution action selected by the real-time decision apparatus 1 is 4, and the priority coefficient (3) of the execution action 1 is less than the preset threshold (4), the execution action 1 is not selected; because the priority coefficient (5) of the execution action 2 is greater than the preset threshold (4), the execution action 2 is selected.

S610. The real-time decision apparatus 1 sends, according to indication information, execution information for executing at least one execution action in the two execution actions.

Exemplarily, because the event information 1 received by the real-time decision apparatus 1 in step S606 is: <output event 1, output event 2, IP-A, and IP-B>, where the indication information is IP-A and IP-B, that is, the indication information includes an identifier of an object (IP address of user A: IP-A) and an identifier of the complex event processing apparatus (IP address of the routing unit: IP-B), the real-time decision apparatus 1 sends a response message <execution information of the execution action 2, and IP-A> to the routing unit 1.

S611. The routing unit 1 sends, according to an identifier of an object, execution information of an execution action to the object.

Exemplarily, on a basis of the example in step S610, the routing unit 1 sends an execution message of the execution action 2 to the object according to the identifier of the object (IP-A).

This embodiment of the present invention provides a complex event processing method, including: receiving an input event sent by an event source, where the input event is triggered at the event source by an object, and the input event includes an identifier of the object and an event type; acquiring, according to a preset database, M mode rules corresponding to the event type, where each mode rule includes one sending primary key, the preset database includes at least one event type and mode rules corresponding to the event type, and M is greater than or equal to 1; performing mode matching between the input event and the M mode rules separately to acquire N output events, where each output event includes a sending primary key in a mode rule for acquiring each output event, N is greater than or equal to 0, and N is less than or equal to M; and if N is greater than or equal to 1, sending at least one piece of event information to a real-time decision apparatus, where each piece of the event information includes Q output events and indication information, where the Q output events are output events that are included in the N output events and have a same sending primary key, Q is greater than or equal to 1, and the indication information includes the identifier of the object, so that the real-time decision apparatus is instructed to send execution information of an execution action to the object. On the one hand, because the complex event processing apparatus includes indication information into sent event information to instruct the real-time decision apparatus to send execution information of an execution action to an object, a system requiring a synchronous response can provide a synchronous response externally when performing complex event processing by using the complex event processing method provided by the present invention; on the other hand, because output events including a same sending primary key are included into a same piece of event information and sent to the real-time decision apparatus, the output events may be correlated, so that the real-time decision apparatus performs aggregation and centralized processing on the output events to avoid information flooding, thereby solving a problem in the prior art that a system requiring a synchronous response cannot provide a synchronous response externally when performing complex event processing or that information flooding is caused even if a CEP device is simply changed to a synchronous response device.

Embodiment 6

Figure 7:
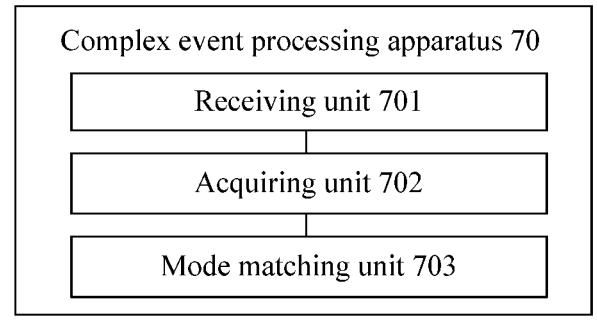
FIG. 7 is a schematic structural diagram of a complex event processing apparatus according to an embodiment of the present invention.

Embodiment 6 of the present invention provides a complex event processing apparatus 70. As shown in FIG. 7, the complex event processing apparatus 70 may include: a receiving unit 701, configured to receive an input event sent by an event source, where the input event is triggered at the event source by an object, and the input event includes an identifier of the object and an event type; an acquiring unit 702, configured to acquire, according to a preset database, M mode rules corresponding to the event type, where each mode rule includes one sending primary key, the preset database includes at least one event type and mode rules corresponding to the event type, and M is greater than or equal to 1; and a mode matching unit 703, configured to perform mode matching between the input event and the M mode rules separately to acquire N output events, where each output event includes a sending primary key in a mode rule for acquiring each output event, N is greater than or equal to 0, and N is less than or equal to M; where the mode matching unit 703 may be further configured to: if N is greater than or equal to 1, send at least one piece of event information to a real-time decision apparatus, where each piece of the event information includes Q output events and indication information, where the Q output events are output events that are included in the N output events and have a same sending primary key, Q is greater than or equal to 1, and the indication information includes the identifier of the object, so that the real-time decision apparatus is instructed to send execution information of an execution action to the object.

Further, the receiving unit 701 may be further configured to: receive a response message sent by the real-time decision apparatus, where the response message includes the identifier of the object and the execution information of the execution action; and send, according to the identifier of the object, the execution information of the execution action to the event source indicated by the identifier of the object.

Further, the mode rule may further include a mode matching primary key, an execution condition, and an event.

Correspondingly, the mode matching unit 703 may specifically be further configured to: if it is determined, according to a mode matching primary key in a first mode rule, that an execution condition in the first mode rule may be met, acquire an output event of the first mode rule, where the output event of the first mode rule includes a sending primary and an event key in the first mode rule, and the first mode rule is any one of the M mode rules; or if it is determined, according to a mode matching primary key in a second mode rule, that an execution condition in the second mode rule is not met, generate no output event, where the second mode rule is any one of the M mode rules.

Figure 8:
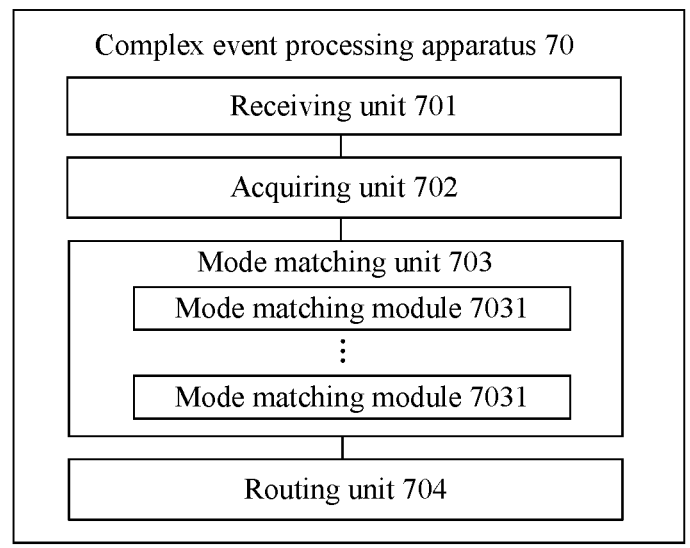
FIG. 8 is a schematic structural diagram of another complex event processing apparatus according to an embodiment of the present invention.

Preferably, referring to FIG. 8, the complex event processing apparatus 70 may further include a routing unit 704, and the mode matching unit 703 may include at least two mode matching modules 7031, where: the routing unit 704 may be configured to allocate the input event to P mode matching modules 7031 separately according to the sending primary key included in each mode rule in the M mode rules acquired by the acquiring unit 702, where the P mode matching modules are mode matching modules that are in the at least two mode matching modules and corresponding to the sending primary key included in each mode rule in the M mode rules in the preset database, and the preset database further includes at least one sending primary key and a mode matching module corresponding to the at least one sending primary key; and each mode matching module 7031 may be configured to separately perform matching between the input event and mode rules having sending primary keys corresponding to the mode matching module in the preset database, in the M mode rules, and when the input event matches one mode rule corresponding to the mode matching module, acquire an output event.

Further, the mode matching module 7031 may specifically be configured to: acquire, by filtering the M mode rules, the mode rules having the sending primary keys corresponding to the mode matching module in the preset database; and if it is determined, according to a mode matching primary key in a third mode rule, that an execution condition in the third mode rule may be met, acquire an output event of the third mode rule, where the output event of the third mode rule includes a sending primary key in the third mode rule and an event, and the third mode rule is any one of the mode rules corresponding to the mode matching module; or if it is determined, according to a mode matching primary key in a fourth mode rule, that an execution condition in the fourth mode rule is not met, generate no output event, where the fourth mode rule is any one of the mode rules corresponding to the mode matching module.

It should be noted that the receiving unit 701, the acquiring unit 702, and the routing unit 704 may be combined into one unit, which is not limited in the present invention.

This embodiment of the present invention provides a complex event processing apparatus 70. The complex event processing apparatus receives an input event sent by an event source, where the input event is triggered at the event source by an object, and the input event includes an identifier of the object and an event type; acquires, according to a preset database, M mode rules corresponding to the event type, where each mode rule includes one sending primary key, the preset database includes at least one event type and mode rules corresponding to the event type, and M is greater than or equal to 1; performs mode matching between the input event and the M mode rules separately to acquire N output events, where each output event includes a sending primary key in a mode rule for acquiring each output event, N is greater than or equal to 0, and N is less than or equal to M; and if N is greater than or equal to 1, sends at least one piece of event information to a real-time decision apparatus, where each piece of the event information includes Q output events and indication information, where the Q output events are output events that are included in the N output events and have a same sending primary key, Q is greater than or equal to 1, and the indication information includes the identifier of the object, so that the real-time decision apparatus is instructed to send execution information of an execution action to the object. On the one hand, because the complex event processing apparatus includes indication information into sent event information to instruct the real-time decision apparatus to send execution information of an execution action to an object, a system requiring a synchronous response can provide a synchronous response externally when performing complex event processing by using the complex event processing method provided by the present invention; on the other hand, because output events including a same sending primary key are included into a same piece of event information and sent to the real-time decision apparatus, the output events may be correlated, so that the real-time decision apparatus performs aggregation and centralized processing on the output events to avoid information flooding, thereby solving a problem in the prior art that a system requiring a synchronous response cannot provide a synchronous response externally when performing complex event processing or that information flooding is caused even if a CEP device is simply changed to a synchronous response device.

Embodiment 7

Figure 9:
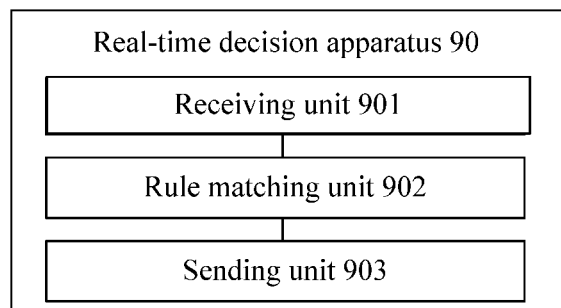
FIG. 9 is a schematic structural diagram of a real-time decision apparatus according to an embodiment of the present invention.

Embodiment 7 of the present invention provides a real-time decision apparatus 90. As shown in FIG. 9, the real-time decision apparatus 90 may include: a receiving unit 901, configured to receive event information sent by a complex event processing apparatus, where the event information includes at least one event and indication information; a rule matching unit 902, configured to match each event in the at least one event with decision rules in a preset database separately to acquire P execution actions, where P is greater than or equal to 1, and the preset database includes at least one decision rule and an execution action corresponding to the at least one decision rule; and a sending unit 903, configured to send, according to the indication information, execution information for executing at least one execution action in the P execution actions.

Optionally, the indication information includes an identifier of an object; and correspondingly, the sending unit 903 may specifically be further configured to: send, according to the identifier of the object, the execution information for executing the at least one execution action to the object.

Optionally, the indication information includes an identifier of an object and an identifier of the complex event processing apparatus; and correspondingly, the sending unit 903 specifically is further configured to: send a response message to the complex event processing apparatus according to the identifier of the complex event processing apparatus, where the response message includes the identifier of the object and the execution information for executing the at least one execution action.

Further, the rule matching unit 902 may specifically be configured to: if one event meets one decision rule, acquire, according to the preset database, an execution action corresponding to the one decision rule, where the one event is any one event in the at least one event included in the event information, and the one decision rule is any one decision rule in the preset database.

Figure 10:
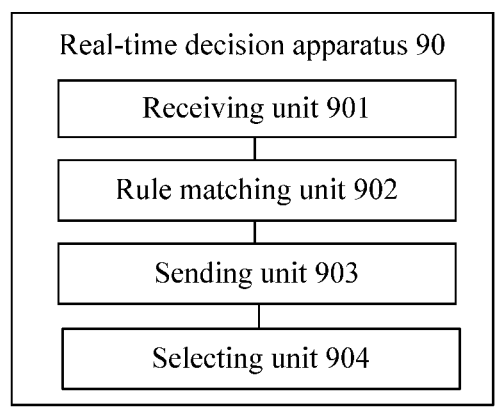
FIG. 10 is a schematic structural diagram of another real-time decision apparatus according to an embodiment of the present invention.

Further, as shown in FIG. 10, the real-time decision apparatus 90 may further include: a selecting unit 904, configured to select the at least one execution action from the P execution actions.

Further, the selecting unit 904 may specifically be further configured to: acquire, according to the preset database, a priority coefficient of each execution action in the P execution actions, where the preset database further includes at least one execution action and a priority coefficient corresponding to the at least one execution action; and select, according to the priority coefficient of each execution action, an execution action whose priority coefficient is greater than or equal to a preset threshold.

This embodiment of the present invention provides a real-time decision apparatus 90. The real-time decision apparatus receives event information sent by a complex event processing apparatus, where the event information includes at least one event and indication information; matches each event in the at least one event with decision rules in a preset database to acquire P execution actions, where P is greater than or equal to 1, and the preset database includes at least one decision rule and an execution action corresponding to the at least one decision rule; and sends, according to the indication information, execution information for executing at least one execution action in the P execution actions. On the one hand, because indication information is included in event information sent by the complex event processing apparatus and received by the real-time decision apparatus, and the real-time decision apparatus sends, according to the indication information, execution information for executing at least one execution action in P execution actions to an object, the real-time decision apparatus provides a synchronous response externally when performing complex event processing in cooperation with the complex event processing apparatus; on the other hand, because output events including a same sending primary key are included into a same piece of event information and sent to the real-time decision apparatus, the output events may be correlated, so that the real-time decision apparatus performs aggregation and centralized processing on the output events to avoid information flooding, thereby solving a problem in the prior art that a system requiring a synchronous response cannot provide a synchronous response externally when performing complex event processing or that information flooding is caused even if a CEP device is simply changed to a synchronous response device.

Embodiment 8

Figure 11:
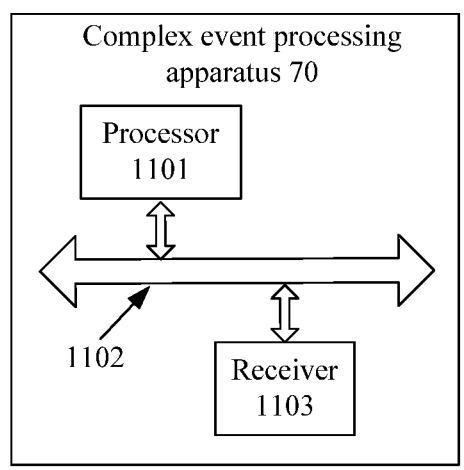
FIG. 11 is a schematic structural diagram of another complex event processing apparatus according to an embodiment of the present invention.

Embodiment 8 of the present invention provides a complex event processing apparatus 70. As shown in FIG. 11, the complex event processing apparatus 70 may include: at least one processor 1101; at least one communications bus 1102, configured to implement connection and mutual communication between components; and a receiver 1103.

The communications bus 1102 may be an industry standard architecture (Industry Standard Architecture, ISA for short) bus, a peripheral component interconnect (PCI) bus, an extended industry standard architecture (EISA) bus, or the like. The bus may be categorized as an address bus, a data bus, a control bus, or the like. For ease of indicating, the bus in FIG. 11 is indicated by only a bold line, but is not mean that only one bus or one type of bus exists. The processor 1101 may be a central processing unit (Central Processing Unit, CPU for short), or an application-specific integrated circuit (ASIC), or is configured as one or more integrated circuits for implementing the embodiments of the present invention.

The receiver 1103 is configured to receive an input event sent by an event source, where the input event is triggered at the event source by an object, and the input event includes an identifier of the object and an event type.

The processor 1101 is configured to acquire, according to a preset database, M mode rules corresponding to the event type, where each mode rule includes one sending primary key, the preset database includes at least one event type and mode rules corresponding to the event type, and M is greater than or equal to 1.

The processor 1101 may be further configured to perform mode matching between the input event and the M mode rules separately to acquire N output events, where each output event includes a sending primary key in a mode rule for acquiring each output event, N is greater than or equal to 0, and N is less than or equal to M.

The processor 1101 may be further configured to send at least one piece of event information to a real-time decision apparatus if N is greater than or equal to 1, where each piece of the event information includes Q output events and indication information, where the Q output events are output events that are included in the N output events and have a same sending primary key, Q is greater than or equal to 1, and the indication information includes the identifier of the object, so that the real-time decision apparatus is instructed to send execution information of an execution action to the object.

Further, the receiver 1103 may be further configured to: receive a response message sent by the real-time decision apparatus, where the response message includes the identifier of the object and the execution information of the execution action; and send, according to the identifier of the object, the execution information of the execution action to the event source indicated by the identifier of the object.

Further, the mode rule may further include a mode matching primary key, an execution condition, and an event.

Correspondingly, the processor 1101 may specifically be further configured to: if it is determined, according to a mode matching primary key in a first mode rule, that an execution condition in the first mode rule may be met, acquire an output event of the first mode rule, where the output event of the first mode rule includes a sending primary and an event key in the first mode rule, and the first mode rule is any one of the M mode rules; or if it is determined, according to a mode matching primary key in a second mode rule, that an execution condition in the second mode rule is not met, generate no output event, where the second mode rule is any one of the M mode rules.

This embodiment of the present invention provides a complex event processing apparatus 70. The complex event processing apparatus receives an input event sent by an event source, where the input event is triggered at the event source by an object, and the input event includes an identifier of the object and an event type; acquires, according to a preset database, M mode rules corresponding to the event type, where each mode rule includes one sending primary key, the preset database includes at least one event type and mode rules corresponding to the event type, and M is greater than or equal to 1; performs mode matching between the input event and the M mode rules separately to acquire N output events, where each output event includes a sending primary key in a mode rule for acquiring each output event, N is greater than or equal to 0, and N is less than or equal to M; and if N is greater than or equal to 1, sends at least one piece of event information to a real-time decision apparatus, where each piece of the event information includes Q output events and indication information, where the Q output events are output events that are included in the N output events and have a same sending primary key, Q is greater than or equal to 1, and the indication information includes the identifier of the object, so that the real-time decision apparatus is instructed to send execution information of an execution action to the object. On the one hand, because the complex event processing apparatus includes indication information into sent event information to instruct the real-time decision apparatus to send execution information of an execution action to an object, a system requiring a synchronous response can provide a synchronous response externally when performing complex event processing by using the complex event processing method provided by the present invention; on the other hand, because output events including a same sending primary key are included into a same piece of event information and sent to the real-time decision apparatus, the output events may be correlated, so that the real-time decision apparatus performs aggregation and centralized processing on the output events to avoid information flooding, thereby solving a problem in the prior art that a system requiring a synchronous response cannot provide a synchronous response externally when performing complex event processing or that information flooding is caused even if a CEP device is simply changed to a synchronous response device.

Embodiment 9

Figure 12:
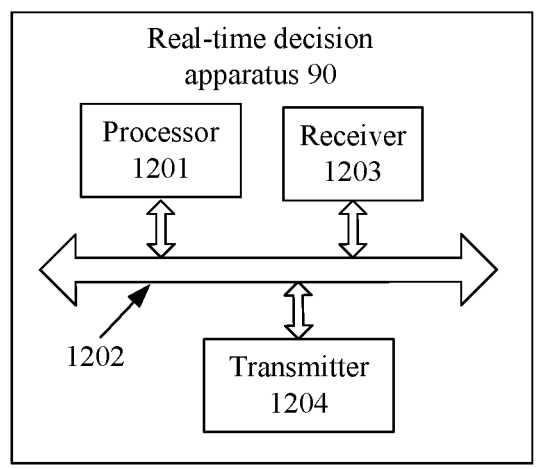
FIG. 12 is a schematic structural diagram of still another real-time decision apparatus according to an embodiment of the present invention.

Embodiment 9 of the present invention provides a real-time decision apparatus 90. As shown in FIG. 12, the real-time decision apparatus 90 may include: at least one processor 1201; at least one communications bus 1202, configured to implement connection and mutual communication between apparatuses; a receiver 1203; and a transmitter 1204.

The communications bus 1202 may be an industry standard architecture (Industry Standard Architecture, ISA for short) bus, a peripheral component interconnect (Peripheral Component, PCI for short) bus, an extended industry standard architecture (Extended Industry Standard Architecture, EISA) bus, or the like. The bus may be categorized as an address bus, a data bus, a control bus, or the like. For ease of indicating, the bus in FIG. 12 is indicated by only a bold line, but it does not mean that only one bus or one type of bus exists. The processor 1201 may be a central processing unit (CPU), or an application-specific integrated circuit (ASIC), or is configured as one or more integrated circuits for implementing the embodiments of the present invention.

The receiver 1203 is configured to receive event information sent by a complex event processing apparatus, where the event information includes at least one event and indication information.

The processor 1201 is configured to match each event in the at least one event with decision rules in a preset database separately to acquire P execution actions, where P is greater than or equal to 1, and the preset database includes at least one decision rule and an execution action corresponding to the at least one decision rule.

The transmitter 1204 is configured to send, according to the indication information, execution information for executing at least one execution action in the P execution actions.

Optionally, the indication information includes an identifier of an object; and correspondingly, the transmitter 1204 may specifically be further configured to: send, according to the identifier of the object, the execution information for executing the at least one execution action to the object.

Optionally, the indication information includes an identifier of an object and an identifier of the complex event processing apparatus; and correspondingly, the transmitter 1204 specifically is further configured to: send a response message to the complex event processing apparatus according to the identifier of the complex event processing apparatus, where the response message includes the identifier of the object and the execution information for executing the at least one execution action.

Further, the processor 1201 may specifically be configured to: if one event meets one decision rule, acquire, according to the preset database, an execution action corresponding to the one decision rule, where the one event is any one event in the at least one event included in the event information, and the one decision rule is any one decision rule in the preset database.

Further, the processor 1201 may be further configured to select the at least one execution action from the P execution actions.

Further, the processor 1201 may specifically be further configured to: acquire, according to the preset database, a priority coefficient of each execution action in the P execution actions, where the preset database further includes at least one execution action and a priority coefficient corresponding to the at least one execution action; and select, according to the priority coefficient of each execution action, an execution action whose priority coefficient is greater than or equal to a preset threshold.

This embodiment of the present invention provides a real-time decision apparatus 90. The real-time decision apparatus receives event information sent by a complex event processing apparatus, where the event information includes at least one event and indication information; matches each event in the at least one event with decision rules in a preset database to acquire P execution actions, where P is greater than or equal to 1, and the preset database includes at least one decision rule and an execution action corresponding to the at least one decision rule; and sends, according to the indication information, execution information for executing at least one execution action in the P execution actions. On the one hand, because indication information is included in event information sent by the complex event processing apparatus and received by the real-time decision apparatus, and the real-time decision apparatus sends, according to the indication information, execution information for executing at least one execution action in P execution actions to an object, the real-time decision apparatus provides a synchronous response externally when performing complex event processing in cooperation with the complex event processing apparatus; on the other hand, because output events including a same sending primary key are included into a same piece of event information and sent to the real-time decision apparatus, the output events may be correlated, so that the real-time decision apparatus performs aggregation and centralized processing on the output events to avoid information flooding, thereby solving a problem in the prior art that a system requiring a synchronous response cannot provide a synchronous response externally when performing complex event processing or that information flooding is caused even if a CEP device is simply changed to a synchronous response device.

Embodiment 10

Figure 13:
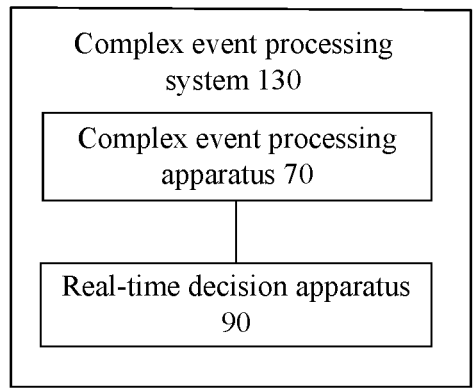
FIG. 13 is a schematic structural diagram of a complex event processing system according to an embodiment of the present invention.

Embodiment 10 of the present invention provides a complex event processing system 130. As shown in FIG. 13, the complex event processing system 130 may include: the complex event processing apparatus 70 according to any one of the foregoing embodiments; and the real-time decision apparatus 90 according to any one of the foregoing embodiments.

This embodiment of the present invention provides a complex event processing system 130. In the system, a complex event processing apparatus receives an input event sent by an event source; acquires, according to a preset database, M mode rules corresponding to the event type; performs mode matching between the input event and the M mode rules separately to acquire N output events; and sends at least one piece of event information to a real-time decision apparatus if N is greater than or equal to 1. The real-time decision apparatus receives the event information sent by the complex event processing apparatus; matches each event in the at least one event with decision rules in a preset database to acquire P execution actions; and sends, according to the indication information, execution information for executing at least one execution action in the P execution actions. On the one hand, because the complex event processing apparatus includes indication information into sent event information to instruct the real-time decision apparatus to send execution information of an execution action to an object, a system requiring a synchronous response can provide a synchronous response externally when performing complex event processing by using the complex event processing method provided by the present invention; on the other hand, because output events including a same sending primary key are included into a same piece of event information and sent to the real-time decision apparatus, the output events may be correlated, so that the real-time decision apparatus performs aggregation and centralized processing on the output events to avoid information flooding, thereby solving a problem in the prior art that a system requiring a synchronous response cannot provide a synchronous response externally when performing complex event processing or that information flooding is caused even if a CEP device is simply changed to a synchronous response device.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A complex event processing method comprising:
   at a complex event processing apparatus, receiving an input event sent by an event source, wherein the input event is triggered at the event source by an object, and the input event comprises an identifier of the object and an event type;
   acquiring, according to a preset database, M mode rules corresponding to the event type, wherein each mode rule comprises one sending primary key, the preset database comprises at least one event type and mode rules corresponding to the event type, and M is greater than or equal to 1;
   performing mode matching between the input event and the M mode rules separately to acquire N output events, wherein each output event comprises a sending primary key in a mode rule for acquiring each output event, wherein N is greater than or equal to 0, and N is less than or equal to M; and
   in response to determining that N is greater than or equal to 1, sending at least one piece of event information to a real-time decision apparatus, wherein each piece of the event information that is sent comprises Q output events and indication information, wherein the Q output events are output events that are comprised in the N output events and have a same sending primary key, wherein Q is greater than or equal to 1, and the indication information comprises the identifier of the object, so that the real-time decision apparatus is instructed to send execution information of an execution action to the object.

2. The method according to claim 1, wherein the indication information further comprises an identifier of the complex event processing apparatus, and after the sending of at least one piece of event information, the method further comprises:
   receiving a response message sent by the real-time decision apparatus, wherein the response message comprises the identifier of the object and the execution information of the execution action; and sending, according to the identifier of the object, the execution information of the execution action to the event source indicated by the identifier of the object.

3. The method according to claim 1, wherein the mode rule further comprises a mode matching primary key, an execution condition, and an event; and wherein the performing mode matching comprises:
if it is determined, according to a mode matching primary key in a first mode rule, that an execution condition in the first mode rule is met, acquiring an output event of the first mode rule, wherein the output event of the first mode rule comprises a sending primary key and an event in the first mode rule, and the first mode rule is any one of the M mode rules; or
if it is determined, according to a mode matching primary key in a second mode rule, that an execution condition in the second mode rule is not met, generating no output event, wherein the second mode rule is any one of the M mode rules.

4. The method according to claim 1, wherein the complex event processing apparatus comprises at least two mode matching modules; and wherein before the performing mode matching, the method further comprises:
allocating the input event to P mode matching modules separately according to the sending primary key comprised in each mode rule in the M mode rules, wherein the P mode matching modules are mode matching modules that are in the at least two mode matching modules and corresponding to the sending primary key comprised in each mode rule in the M mode rules in the preset database, and the preset database further comprises at least one sending primary key and a mode matching module corresponding to the at least one sending primary key.

5. The method according to claim 4, wherein the mode rule further comprises a mode matching primary key, an execution condition, and an event; and wherein the performing mode matching comprises:
acquiring, by each mode matching module in the P mode matching modules by filtering the M mode rules separately, mode rules having sending primary keys corresponding to the mode matching module in the preset database, and
performing, by each mode matching module in the P mode matching modules, mode matching between the input event and the mode rules corresponding to the mode matching module separately to acquire the N output events.

6. The method according to claim 5, wherein the performing, by each mode matching module in the P mode matching modules, comprises:
if it is determined, according to a mode matching primary key in a third mode rule, that an execution condition in the third mode rule may be met, acquiring an output event of the third mode rule, wherein the output event of the third mode rule comprises a sending primary key and an event in the third mode rule, and the third mode rule is any one of the mode rules corresponding to the mode matching module; or
if it is determined, according to a mode matching primary key in a fourth mode rule, that an execution condition in the fourth mode rule is not met, generating no output event, wherein the fourth mode rule is any one of the mode rules corresponding to the mode matching module.

7. A complex event processing apparatus comprising:
at least one communications bus configured to implement connection and mutual communication between components; and
a receiver configured to receive an input event sent by an event source, wherein the input event is triggered at the event source by an object, and the input event comprises an identifier of the object and an event type;
at least one processor; and
a program for execution in the at least one processor, wherein the program comprises instructions for
acquiring, according to a preset database, M mode rules corresponding to the event type, wherein each mode rule comprises one sending primary key, the preset database comprises at least one event type and mode rules corresponding to the event type, and M is greater than or equal to 1; and
performing mode matching between the input event and the M mode rules separately to acquire N output events, wherein each output event comprises a sending primary key in a mode rule for acquiring each output event, wherein N is greater than or equal to 0, and N is less than or equal to M;
in response to determining that N is greater than or equal to 1, sending at least one piece of event information to a real-time decision apparatus, wherein each piece of the event information comprises Q output events and indication information, wherein the Q output events are output events that are comprised in the N output events and have a same sending primary key, wherein Q is greater than or equal to 1, and the indication information comprises the identifier of the object, so that the real-time decision apparatus is instructed to send execution information of an execution action to the object.

8. The complex event processing apparatus according to claim 7, wherein the receiver is further configured to:
receive a response message sent by the real-time decision apparatus, wherein the response message comprises the identifier of the object and the execution information of the execution action; and
send, according to the identifier of the object, the execution information of the execution action to the event source indicated by the identifier of the object.

9. The complex event processing apparatus according to claim 7, wherein the mode rule further comprises a mode matching primary key, an execution condition, and an event; and wherein the program comprises further instructions for:
if it is determined, according to a mode matching primary key in a first mode rule, that an execution condition in the first mode rule may be met, acquire an output event of the first mode rule, wherein the output event of the first mode rule comprises a sending primary key and an event in the first mode rule, and the first mode rule is any one of the M mode rules; or
if it is determined, according to a mode matching primary key in a second mode rule, that an execution condition in the second mode rule is not met, generate no output event, wherein the second mode rule is any one of the M mode rules.

10. A complex event processing system, comprising:
a complex event processing apparatus configured to
receive an input event sent by an event source, wherein the input event is triggered at the event source by an object, and the input event comprises an identifier of the object and an event type;

acquire, according to a preset database, M mode rules corresponding to the event type, wherein each mode rule comprises one sending primary key, the preset database comprises at least one event type and mode rules corresponding to the event type, and M is greater than or equal to 1;

perform mode matching between the input event and the M mode rules separately to acquire N output events, wherein each output event comprises a sending primary key in a mode rule for acquiring each output event, N is greater than or equal to 0, and N is less than or equal to M; wherein in response to determining that N is greater than or equal to 1, send event information to a real-time decision apparatus, wherein the event information comprises Q output events and indication information, wherein the Q output events are output events that are comprised in the N output events and have a same sending primary key, wherein Q is greater than or equal to 1, and the indication information comprises the identifier of the object, so that the real-time decision apparatus is instructed to send execution information of an execution action to the object;

the real-time decision apparatus configured to
- receive the event information sent by the complex event processing apparatus;
- match each event in the event information with decision rules in the preset database separately to acquire P execution actions, wherein P is greater than or equal to 1, and the preset database comprises at least one decision rule and an execution action corresponding to the at least one decision rule; and
- send, according to the indication information, execution information for executing at least one execution action in the P execution actions.

* * * * *